(12) United States Patent
McCloskey et al.

(10) Patent No.: US 6,228,973 B1
(45) Date of Patent: May 8, 2001

(54) METHOD FOR PREPARING HIGH MOLECULAR WEIGHT POLYCARBONATE

(75) Inventors: Patrick Joseph McCloskey, Watervilet; Timothy Brydon Burnell, Niskayuna; Paul Michael Smigelski, Jr., Schenectady, all of NY (US); Johan Pieter Anna Heuts, Randwick (AU); Hendricus Franciscus Zirkzee, Schore (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/584,984

(22) Filed: Jun. 2, 2000

(51) Int. Cl.⁷ .................................................... C08G 64/00
(52) U.S. Cl. ............................................ 528/196; 528/198
(58) Field of Search ...................... 528/196, 198

(56) References Cited

FOREIGN PATENT DOCUMENTS 753704   2/1995   (JP) .

OTHER PUBLICATIONS

McCloskey et al., "Salts of Chelating Agents as Polymerization Catalysts", S.N. 09/451,033, filed Nov. 29, 1999.
McCloskey et al., "Salts of Non–Volatile Acids as Polymerization Catalysts", S.N. 09/497,398, filed on Feb. 4, 2000.
McCloskey et al., "Salts of Aryl Sulfonic Acids as Polymerization Catalysts", S.N. 09/546,597, filed on Apr. 10, 2000.
McCloskey et al., "Alkali Metal Salts of Oxoacids of Sulfur as Polymerization Catalysts", S.N. 09/411,274, filed Oct. 4, 1999.

*Primary Examiner*—Terressa M. Boykin
(74) *Attorney, Agent, or Firm*—Noreen C. Johnson; Douglas E. Stoner

(57) ABSTRACT

A method of preparing polycarbonate by the melt process comprising the steps of:
a) melting a dihydric phenol and a diester of carbonic acid for a time and at a temperature sufficient to form a melt; and thereafter introducing a catalyst composition comprising a tetraorganophosphonium salt or a derivative thereof and
  1) an alkali and/or alkali earth metal compound or derivative thereof or
  2) a less active alkali and/or alkali earth metal derivative thereof into the melt; and
b) oligomerizing the product from step a) to a number average molecular weight of from about 3000 to about 7500; and
c) polymerizing the product from step b) to a number average molecular weight of from about 16,000 to about 35,000.

7 Claims, No Drawings

METHOD FOR PREPARING HIGH MOLECULAR WEIGHT POLYCARBONATE

FIELD OF THE INVENTION

This invention is related to a method of preparing high molecular weight polycarbonate by the melt process using a catalyst system comprising a tetraorganophosphonium carboxylic acid salt or a derivative thereof and 1) an alkali and/or alkali earth metal compound or a derivative thereof or 2) a less active alkali metal salt or a derivative thereof. The polycarbonate has a low level of branched side products and has good processing characteristics.

BACKGROUND OF THE INVENTION

Conventional industrial plants synthesize polycarbonate by mixing together an aqueous solution of dihydric compound (e.g., bisphenol-A) with an organic solvent (e.g., dichloromethane) containing a carbonyl halide (e.g., phosgene) Upon mixing the immiscible organic and aqueous phases, the dihydric compound reacts with the carbonyl halide at the phase interface. Typically, a phase transfer catalyst, such as a tertiary amine, is added to the aqueous phase to enhance this reaction. This synthesis method is commonly known as the "interfacial" synthesis method for preparing polycarbonate.

The interfacial method for making polycarbonate has several inherent disadvantages. First it is a disadvantage to operate a process which requires phosgene as a reactant due to obvious safety concerns. Second it is a disadvantage to operate a process which requires using large amounts of an organic solvent because expensive precautions must be taken to guard against any adverse environmental impact. Third, the interfacial method requires a relatively large amount of equipment and capital investment. Fourth, the polycarbonate produced by the interfacial process is prone to having inconsistent color, higher levels of particulates, and higher chlorine content, which can cause corrosion.

Some new commercial polycarbonate plants synthesize polycarbonate by a transesterification reaction whereby a diester of carbonic acid (e.g., diphenylcarbonate) is condensed with a dihydric compound (e.g., bisphenol-A). This reaction is performed without a solvent, and is driven to completion by mixing the reactants under reduced pressure and high temperature with simultaneous distillation of the phenol produced by the reaction. This synthesis technique is commonly referred to as the "melt" technique. The melt technique is superior over the interfacial technique because it does not employ phosgene, it does not require a solvent, and it uses less equipment. Moreover, the polycarbonate produced by the melt process does not contain chlorine contamination from the reactants, has lower particulate levels, and has a more consistent color. Therefore it is highly desirable to use the melt technique in a commercial manufacturing process.

In the production of polycarbonates by the melt polymerization process, alkali metal hydroxides, in particular sodium hydroxide, are used as polymerization catalysts. While alkali metal hydroxides are useful polymerization catalysts, they also effect side reactions which results in branched side reaction products. This causes changes in the melt behavior of the polycarbonate, which can lead to difficulties in processing.

There exists a need for a polycarbonate produced by the melt process that has less branched side reaction products. Polycarbonates having less side reaction products will have improved properties, for example better ductility and processing characteristics.

BRIEF SUMMARY OF THE INVENTION

In one aspect, the invention relates to a method of preparing polycarbonate by the melt process comprising the steps of a) melting a dihydric phenol and a diester of carbonic acid for a time and at a temperature sufficient to form a melt; and thereafter introducing a catalyst composition comprising from about $1.0 \times 10^{-5}$ to about $5.0 \times 10^{-4}$ moles/mol dihydric phenol of a tetraorganophosphonium salt or a derivative thereof and
   1) from about $1.0 \times 10^{-7}$ to about $1.0 \times 10^{-6}$ moles/mole dihydric phenol of an alkali and/or alkali earth metal compound or derivative thereof or
   2) from about $0.5 \times 10^{-6}$ to about $5.0 \times 10^{-6}$ moles/mole of dihydric phenol of a less active alkali and/or alkali earth metal derivative thereof into the melt; and b) oligomerizing the product from step a) in a two stage reaction system comprising two continuous oligomerization reactors in series, the first oligomerization reactor maintained at a temperature of from about 210° C. to about 260° C.; the second oligomerization reactor maintained at from about 250° C. to about 290° C.; and c) polymerizing the product from step b) in a two stage polymerization system comprising two continuous polymerization reactors in series, the first polymerization reactor maintained at a temperature of from about 290° C. to about 315° C.; the second polymerization reactor maintained at from about 290° C. to about 310° C.

DETAILED DESCRIPTION OF THE INVENTION

The present invention addresses these concerns and provided further surprising properties.

The present invention may be understood more readily by reference to the following detailed description of preferred embodiments of the invention and the examples included therein.

Before the present compositions of matter and methods are disclosed and described, it is to be understood that this invention is not limited to specific synthetic methods or to particular formulations, as such may, of course, vary. It is also to be understood that the terminology used herein is for the purpose of describing particular embodiments only and is not intended to be limiting.

In the following specification, reference will be made to a number of terms which shall be defined to have the following meanings:

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein, the term "melt polycarbonate" refers to a polycarbonate made by the transesterification of a carbonate diester with a dihydroxy compound.

"BPA" is herein defined as bisphenol A or 2,2-bis(4-hydroxyphenyl)propane.

The terms "diphenol" and "dihydric phenol" as used herein are synonymous.

The "melt process" as used herein refers to a method of making polycarbonates by the melt condensation of a diester of carbonic acid and a dihydric phenol.

"Less active alkali metal salt" as used herein means that the referenced compound exhibits activity towards transesterification, but is less active than NaOH under the same conditions; and exhibits more selectivity than NaOH in avoiding side product formation, in particular Fries formation, at the same conditions.

In one aspect, the present invention relates to a method of preparing polycarbonate by the melt process, comprising the addition of a catalyst composition comprising an alkali and/or alkali earth metal compound or a derivative thereof and a tetraorganophosphonium carboxylate salt or a derivative thereof. This aspect of the invention further relates to polycarbonates prepared by this method.

In a further aspect, the present invention relates to a method of preparing polycarbonate by the melt process, comprising the addition of a less active alkali metal base or a derivative thereof and a tetraorganophosphonium carboxylate salt or a derivative thereof. This aspect of the invention further relates to polycarbonate prepared by this method.

In the present invention, it was unexpectedly found that the process as defined produces a polycarbonate having reduced side reaction products, in particular Fries products, and as a result produces a product having good processing characteristics. In particular, it was unexpectedly found that the method of the present invention, comprising the addition of a catalyst composition comprising 1) a tetraorganophosphonium carboxylate salt or a derivative thereof and an alkali and/or alkali earth metal compound, or 2) a less active alkali metal salt or a derivative thereof and a tetraorganphosphonium carboxylate salt, at certain conditions, produced a polycarbonate having a high molecular weight, preferably a number average molecular weight ($M_n$) above about 7,000; while the addition of a tetraorganophosphonium carboxylate salt without an alkali metal base or a derivative thereof or a less active alkali metal salt or a derivative thereof did not result in high molecular weight build under the same conditions. Additionally, it was unexpectedly found that the processing conditions and catalyst composition of the present invention provide lower branching side reaction products as compared to tetraalkyl ammonium base compound and alkali metal catalyst combinations.

It was further unexpectedly found that the use of an electronic grade tetraorganophosphonium carboxylic acid salt, such as TBPA, (having a purity of less than about 1000 ppm Cl- and less than about 100 ppm Na) in combination with higher temperatures in the range of about 280 to about 320° C. and very pure monomers (containing less than $0.5 \times 10^{-7}$ moles sodium/mole dihydric phenol) in a melt polymerization process requires the addition of a cocatalyst. Additionally, it was found that tetraorganophosphonium carboxylic acid salts will decompose at processing temperatures above about 240° C. and times longer than about 60 minutes. For example, at temperatures above about 240° C. the tetrabutyl phosphonium ion begins to decompose at a significant rate; and at temperatures above about 260° C. and times longer than about 60 minutes will result in complete decomposition of the tetrabutyl phosphonium ion and an $M_n$ of less than 7,000 for the final polymer. Therefore, running shorter reaction times and higher temperature will require the use of added alkali metal catalyst to build molecular weight. It was further unexpectedly found that the use of a tetraorganophosphonium carboxylic acid salt in place of a tetraalkyl ammonium salt as a cocatalyst allows the use of lower concentration of alkali and/or alkaline earth metal compound.

Polycarbonate produced by the melt process typically has higher Fries content than polycarbonates produced by the interfacial method. As used herein the term "Fries" or "fries" refers to a repeating unit in polycarbonate having the following formula (I):

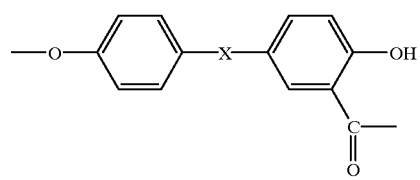

I where the X variable represents

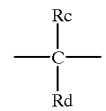

or

Variable $R_c$ and $R_d$ each independently represent a hydrogen atom or a monovalent hydrocarbon group and may form a ring structure. Variable $R_e$ is a divalent hydrocarbon group.

It is very desirable to have a low Fries content in the polycarbonate product, as Fries products reduce the performance characteristics of the polycarbonate, such as the ductility. Higher Fries contents results in lower ductility. Preparing polycarbonate by the melt process results in the formation of Fries products.

Dihydric phenols which are useful in preparing the polycarbonate of the invention may be represented by the general formula

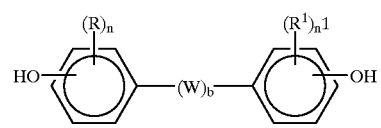

wherein:
R is independently selected from halogen, monovalent hydrocarbon, and monovalent hydrocarbonoxy radicals;
$R^1$ is independently selected from halogen, monovalent hydrocarbon, and monovalent hydrocarbonoxy radicals:
W is selected from divalent hydrocarbon radicals,

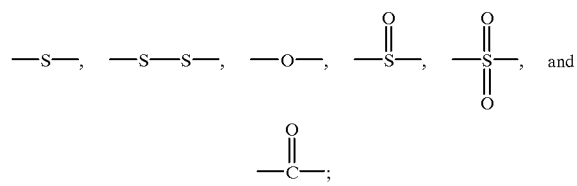

n and $n^1$ are independently selected from integers having a value of from 0 to 4 inclusive; and
b is either zero or one.

The monovalent hydrocarbon radicals represented by R and $R^1$ include the alkyl, cycloalkyl, aryl, aralkyl and alkaryl radicals. The preferred alkyl radicals are those containing from 1 to about 12 carbon atoms. The preferred cycloalkyl radicals are those containing from 4 to about 8 ring carbon atoms. The preferred aryl radicals are those containing from 6 to 12 ring carbon atoms, i.e., phenyl, naphthyl, and biphenyl. The preferred alkaryl and aralkyl radicals are those containing from 7 to about 14 carbon atoms.

The preferred halogen radicals represented by R and $R^1$ are chlorine and bromine.

The divalent hydrocarbon radicals represented by include the alkylene, alkylidene, cycloalkylene and cycloalkylidene radicals. The preferred alkylene radicals are those containing from 2 to about 30 carbon atoms. The preferred alkylidene radicals are those containing from 1 to about 30 carbon atoms. The preferred cycloalkylene and cycloalkylidene radicals are those containing from 6 to about 16 ring carbon atoms.

The monovalent hydrocarbonoxy radicals represented by R and $R^1$ may be represented by the formula —$OR^2$ wherein $R^2$ is a monovalent hydrocarbon radical of the type described hereinafore. Preferred monovalent hydrocarbonoxy radicals are the alkoxy and aryloxy radicals.

Suitable dihydric phenols include, but are not limited to, BPA; 2,2-bis(3,5-dibromo-4-hydroxyphenyl)propane; 2,2-bis(3,5-dimethyl-4-hydroxyphenyl)propane; 1,1-bis(4-hydroxyphenyl)cyclohexane; 1,1-bis(3,5-dimethyl-4-hydroxyphenyl)cyclohexane; 1,1-bis(4-hydroxyphenyl) decane; 1,1-bis(4-hydroxyphenyl)propane; 1,1-bis(4-hydroxyphenyl)cyclodecane; 1,1-bis(3,5-dimethyl-4-hydroxyphenyl)cyclododecane; 4,4-dihydroxyphenyl ether; 4,4-thiodiphenol; 4-4-dihydroxy-3,3-dichlorodiphenyl ether; 4,4-thiodiphenol; 4,4-dihydroxy-3,3-dichlorodiphenyl ether; 4,4-dihydroxy-2,5-dihydroxydiphenyl ether; BPI; 1,1-bis(4-hydroxyphenyl)-1-phenylethane; 1,1-bis(3-methyl-4-hydroxyphenyl)-1-phenylethane, and mixtures thereof. In one embodiment, the residues of dihydric phenol in the polycarbonate comprise 100 mol % of residues derived from BPA.

Optionally, polyfunctional compounds may be utilized. Suitable polyfunctional compounds used in the polymerization of branched polycarbonate include, but are not limited to, 1,1,1-tris(4-hydroxyphenyl)ethane,
4-[4-[1,1-bis(4-hydroxyphenyl)-ethyl]-dimethylbennzyl],
trimellitic anhydride,
trimellitic acid, or their acid chloride derivatives.

As the diester of carbonic acid, various compounds may be used, including, but not limited to diaryl carbonate compounds, dialkyl carbonate compounds and alkylaryl carbonate compounds. Suitable diesters of carbonic acid include, but are not limited to, diphenyl carbonate; bis(4-t-butylphenyl)carbonate; bis(2,4-dichlorophenyl)carbonate; bis(2,4,6-trichlorphenyl)carbonate; bis(2-cyanophenyl) carbonate; bis(o-nitrophenyl)carbonate; ditolyl carbonate; m-cresol carbonate; dinaphthyl carbonate; bis(diphenyl) carbonate; diethylcarbonate; dimethyl carbonate; dibutyl carbonate; dicyclohexyl carbonate; and mixtures thereof. Of these, diphenyl carbonate is preferred. If two or more of these compound are utilized, it is preferable that one is diphenyl carbonate.

In the process of the present invention, an endcapping agent may optionally be used. Suitable endcapping agents include monovalent aromatic hydroxy compounds, haloformate derivatives of monovalent aromatic hydroxy compounds, monovalent carboxylic acids, halide derivatives of monovalent carboxylic acids, and mixtures thereof.

Suitable endcapping agents include, but are not limited to phenol, p-tert-butylphenol; p-cumylphenol; p-cumylphenolcarbonate; undecanoic acid, lauric acid, stearic acid; phenyl chloroformate, t-butyl phenyl chloroformate, p-cumyl chloroformate, chroman chloroformate, octyl phenyl; nonyl phenyl chloroformate or a mixture thereof.

If present, the endcapping agent is preferably present in amounts of about 0.01 to about 0.20 moles, preferably about 0.02 to about 0.15 moles, even more preferably about 0.02 to about 0.10 moles per 1 mole of the dihydric phenol.

In one embodiment of the present invention, the catalyst composition comprises at least one alkali and/or alkali earth metal compound. These compounds are preferably used in the forms of derivatives of alkali metals and alkali earth metals, such as organic acid salts; inorganic acid salts; oxides; hydroxides; hydrides; alcoholates; or a mixture thereof. It was found that the use of an alkali and/or alkali earth metal compound in combination with the tetraorganophosphonium carboxylate salt required less of the alkali and/or alkali earth metal compound than is conventionally used in the melt process to product polycarbonate. In particular, it was unexpectedly found that the use of a tetraorganophosphonium carboxylate salt or a derivative thereof allows the use of less alkali and/or alkali earth metal compound than use of tetraalkylammonium compounds, such as TMAH, to produce the same molecular weight build with significantly less Fries.

Suitable alkali metal compounds which may be used as catalysts include, but are not limited to, sodium hydroxide, potassium hydroxide, lithium hydroxide, sodium hydrogen carbonate, potassium hydrogen carbonate, lithium hydrogen carbonate, sodium carbonate, potassium carbonate, lithium carbonate, sodium acetate, potassium acetate, lithium acetate, sodium stearate, potassium stearate, lithium stearate and mixtures thereof.

Suitable alkaline-earth metal compounds which may be used as catalyst include, but are not limited to, calcium hydroxide, barium hydroxide, magnesium hydroxide, strontium hydroxide, calcium hydrogen carbonate, barium hydrogen carbonate, magnesium hydrogen carbonate, strontium hydrogen carbonate, calcium carbonate, barium carbonate, magnesium carbonate, strontium carbonate, calcium acetate, barium acetate, magnesium acetate, strontium acetate, calcium stearate, barium stearate, magnesium stearate, strontium stearate and mixtures thereof.

In a further embodiment of the invention, use of a less active alkali metal salt with improved selectivity over NaOH in place of the alkali and/or alkali earth metal compound, in combination with a tetraorganophosphonium carboxylic acid salt or derivative thereof will produce good molecular weight build. Suitable less active alkali metal salts include, but are not limited to complexes of alkali borate metal salts with EDTA; alkali and/or alkali earth metal salts of ethylenediamine tetraacetic acid; alkali and/or alkali earth metal salts of nitrilotriacetate; and mixtures thereof; alkali metal salts of aryl sulfonic acids; and alkali metal salts of non-volatile acids. It was found that a number of useful salts are significantly more selective than NaOH toward side product formation, such as Fries, however many of these highly selective salts are less active than NaOH with respect to polymerization. In the present invention it was found that the combination of tetraorganophosphonium carboxylic acid salt and a less active metal salt produce efficient molecular weight build with the added advantage of significantly reduced production of side reaction products, such as Fries. The advantage of using the less active salt is improved Fries selectivity.

Particular examples of suitable less active alkali metal salts or derivatives thereof include, but are not limited to, complexes of alkali borate metal salts with EDTA, such as sodium borate/EDTA; and disodium magnesium EDTA. Other suitable less active alkali metal salts include alkali metal salts of oxo acids of sulfur which are suitable as melt polymerization catalysts including, but are not limited to, sodium sulfite, sodium bisulfite, sodium metabisulfite, sodium thiosulfate, sodium dithionite, and mixtures thereof; preferably sodium sulfite, sodium metabisulfite and mixture thereof, even more preferably sodium metabisulfite.

Other suitable less active alkali metal salts or derivative thereof include, but are not limited to, alkali metal salts of aryl sulfonic acids. Suitable alkali metal salts of aryl sulfonic acids include, but are not limited to, alkali metal salts of p-toluene sulfonic acids, such as sodium tosylate, lithium tosylate, potassium tosylate and cesium tosylate, preferably cesium tosylate.

Other suitable less active alkali metal catalysts include alkali metal salts of nonvolatile acids. By "nonvolatile" it is meant that the referenced compounds have no vapor pressure and no known boiling point. In particular, these compounds are not volatile at temperatures at which melt polymerizations of polycarbonate are typically conducted. The preferred salts of nonvolatile acids of the present invention are alkali metal salts of phosphites; alkali earth metal salts of phosphites; alkali metal salts of phosphates; alkali earth metal salts of phosphates. Suitable salts of nonvolatile acids include, but are not limited to, $NaH_2PO_3$; $NaH_2PO_4$; $Na_2H_2PO_3$; $KH_2PO_4$; $CsH_2PO_4$, $Cs_2H_2PO_4$ and a mixture thereof. In one embodiment, the salt of the nonvolatile acid is $CsH_2PO_4$.

In addition to 1) the alkali and/or alkali earth metal compound or derivative thereof or 2) the less active alkali earth metal salt as described above, the catalyst system comprises a tetraorganophosphonium carboxylic acid salt or a derivative thereof. Examples of suitable tetraorganophosphonium carboxylic acid salts or derivatives thereof, include, but are not limited to:

tetramethylphosphonium acetate;
tetraethylphosphonium acetate
tetrapropylphosphonium acetate
tetrabutylphosphonium acetate
tetrapentylphosphonium acetate
tetrahexylphosphonium acetate
tetraheptylphosphonium acetate
tetraoctylphosphonium acetate
tetradecylphosphonium acetate
tetradodecylphosphonium acetate
tetratolylphosphonium acetate
tetraphenylphosphonium acetate
tetramethylphosphonium benzoate
tetraethylphosphonium benzoate
tetrapropylphosphonium benzoate
tetraphenylphosphonium benzoate
tetramethylphosphonium formate
tetraethylphosphonium formate
tetrapropylphosphonium formate
tetraphenylphosphonium formate
tetramethylphosphonium propionate
tetraethylphosphonium propionate
tetrapropylphosphonium propionate
tetramethylphosphonium butyrate
tetraethylphosphonium butyrate, and
tetrapropylphosphonium butyrate;

and a mixture thereof.

In one embodiment, the tetraorganophosphonium carboxylic acid salt or derivative thereof is tetrabutylphosphonium acetate.

The process of the present invention comprises a) a melting stage b) an oligomerization stage and c) a polymerization stage. In the melting stage, the reactants comprising the diester of the carbonic acid and the dihydric phenol are melted in a vessel at temperatures of from about 160° C. to about 190° C., preferably under a blanket of an inert gas, such as nitrogen. During the melting stage, the catalyst composition comprising the suitable tetraorganophosphonium carboxylic acid salts or derivatives thereof and 1) the alkali and/or alkali earth metal compound or derivative thereof or 2) the less active alkali metal salts or derivatives thereof are introduced into the vessel. The catalysts may be added at the same time or separately.

The melt is thereafter transferred to the oligomerization stage. The oligomerization stage preferably comprises two continuous reactors in series. The first oligomerization reactor is maintained at a temperature of from about 210° C. to about 260° C., preferably from about 230° C. to about 250° C.; and a pressure of from about 200 torr to about 50 torr, preferably from about 150 torr to about 120 torr, more preferably about 130 torr. The residence time in the first oligomerization reactor is preferably less than about one hour, more preferably from about 45 minutes to about 30 minutes, even more preferably about 30 minutes. The product exiting the first reactor preferably has a number average molecular weight (Mw) of less than about 2500, and a branching side product level of less than about 100 ppm, based on the polycarbonate. After the completion of the residence time in the first reactor, the product is transferred to the second reactor.

In the second oligomerization reactor, the temperature is maintained at from about 250° C. to about 290° C.; preferably from about 270° C. to about 280° C.; at a vacuum of less than about 100 torr. The residence time in the second oligomerization reactor is preferably less than about 1 hour, more preferably about 30 to about 45 minutes. The Mw of the product from the second oligomerization reactor is preferably about 3000 to 7500, and the endcap level is preferably greater than about 60% (based on 100× (mole endcap-mole OH)/total mole endcap), however this number may vary depending on the initial stoichiometry. The branching side product of the product of the second oligomerization reactor is preferably below about 500 ppm based on polycarbonate.

After completion of the oligomerization stage, the product is transferred to the polymerization stage. In one embodiment, the polymerization stage comprises two continuous reactors in series, a first polymerization reactor and a second polymerization reactor. In an alternative embodiment, the polymerization stage can be carried out in a batch reactor in discrete steps of increasing temperature with decreasing pressure.

In the embodiment in which the polymerization stage comprises one reactor, the temperature of the polymerization stage is maintained at from about 280° C. to about 320° C.; more preferably at from about 290° C. to about 310° C.; at a vacuum of from about 10 torr to about 0.01 torr; more preferably at from about 2 torr to about 0.1 torr. The residence time in the reactor is preferably from about 10 minutes to about 90 minutes.

In the embodiment in which the polymerization stage comprises two reactors, the temperature of the first polymerization reactor is preferably maintained at from about 300° C. to about 315° C.; and at a vacuum of from about 2 torr to about 0.1 torr, preferably from about 1 torr to about 0.1 torr. The residence time in the second reactor is preferably from about 5 minutes to about 30 minutes. The Mw of the material exiting the first reactor is preferably around about 15,000 to about 20000; preferably about 18,000.

After the first polymerization reactor, the product from the first reactor is transferred to the second polymerization reactor. The temperature in the second polymerization reactor is maintained at from about 285° C. to about 310° C. and at a vacuum of about 0.2 torr. The residence time in the second reactor is preferably about 5 minutes to about 25 minutes. Upon exiting the second reactor, the branching side reaction product is preferably below about 3000 ppm.

If the alkali and/or alkali earth metal compound is used, such as NaOH, the compound is preferably used in an amount of $1.0 \times 10^{-6}$ moles/mole dihydric phenol to about $1.0 \times 10^{-7}$ moles/mole dihydric phenol. If the less active alkali earth metal catalyst is used, the compound is preferably used in an amount of from of $0.1 \times 10^{-6}$ moles/mole dihydric phenol to about $5.0 \times 10^{-6}$ moles/mole dihydric phenol.

The tetraorganophosphonium carboxylic acid salt or a derivative thereof is preferably present in amounts of from about $5.0 \times 10^{-4}$ moles/ mole dihydric phenol to about $1.0 \times 10^{-5}$ moles/mole dihydric phenol. The catalysts may be added in a variety of forms. The catalyst may be added as a solid, for example a powder, or it may be dissolved in a solvent, for example water or alcohol.

Additional additives may also be added to the polycarbonate product as long as they do not adversely affect the properties of the product. These additives include a wide range of substances that are conventionally added to the polycarbonates for a variety of purposes. Specific examples include heat stabilizers, epoxy compounds, ultraviolet absorbers, mold release agents, colorants, antistatic agents, slipping agents, anti-blocking agents, lubricants, antifogging agents, natural oils, synthetic oils, waxes, organic fillers, flame retardants, inorganic fillers and any other commonly known class of additives.

The material and the structures of the reactors used in the present invention are not particularly limited as long as the reactor has an ordinary capability of stirring. It is preferable that the reactors are capable of stirring in high viscosity conditions as the viscosity of the reaction system is increased in later stages of the reaction.

It is also possible to blend the polycarbonate with other polymers, including but not limited to, polyolefins, polystyrenes, polysulfonates, polyamides and polyphenylene ethers.

EXAMPLES

The following examples are set forth to provide those of ordinary skill in the are with a complete description of how the compositions of matter and methods claimed herein are made and evaluated, and are not intended to limit the scope of what the inventors regard as their invention. Efforts have been made to insure accuracy with respect to numbers (e.g., amounts, temperature, etc.) but some errors and deviations should be accounted for. Unless indicated otherwise, parts are by weight, temperature is in ° C.

Molecular weights are reported as number average ($M_n$) and were determined by GPC analysis of polycarbonate prepared by melt polymerization. Standards of polystyrene were used to construct a universal calibration against which polycarbonate could be measured using the Mark-Houwink equation. The temperature of the columns was 25° C. and the mobile phase was chloroform.

Fries content was measured by the KOH methanolysis of resin and is reported as parts per million (ppm). The content of Fries for each of the melt polycarbonates listed in Table 1 was determined as follows. First, 0.50 grams of polycarbonate was dissolved in 5.0 ml of THF (containing p-terphenyl as internal standard). Next, 3.0 ml of 18% KOH in methanol was added to this solution. The resulting mixture was stirred for two hours at this temperature. Next, 1.0 ml of acetic acid was added, and the mixture was stirred for 5 minutes. Potassium acetate was allowed to crystallize over 1 hour. The solid was filtered off and the resulting filtrate was analyzed by liquid chromoatograph using p-terphenyl as the internal standard.

TABLE 1

| Catalyst | Mn | Fries |
|---|---|---|
| TBPA (SACHEM) (electronic grade) | 5,200 | <200 ppm |
| TMAH | 1,700 | <100 ppm |
| TBP benzoate | 5,100 | <200 |
| TMAH (SACHEM)/NaOH ($1.0 \times 10^{-6}$) | 7,800 | 420 |
| TMAH (SACHEM)/NaOH ($5.0 \times 10^{-6}$) | 9,500 | 3,000 |
| TBPA (SACHEM)/NaOH ($1.0 \times 10^{-6}$) | 8,800 | 350 |

Table 1 illustrates that the use of electronic grade TBPA in combination with higher temperatures and pure monomer requires the addition of an added alkali metal catalyst to produce acceptable molecular weight build.

TABLE 2

TMAH as a cocatalyst

| Alkali Metal | Mn | Fries |
|---|---|---|
| NaOH ($5.0 \times 10^{-6}$) | 9,500 | 3,000 |
| NaOH ($1.0 \times 10^{-6}$) | 7,800 | 420 |
| $Na_2B_4O_7$/EDTA ($5.0 \times 10^{-6}$) | 8,330 | 217 |
| $Na_2Mg$/EDTA ($1.0 \times 10^{-6}$) | 6,520 | 206 |
| $NaH_2PO_3$ | 6,367 | 268 |
| $Na_2B_4O_7$/EDTA ($1.0 \times 10^{-6}$) | 6,902 | 173 |

TABLE 3

TBPA as cocatalyst

| Alkali Metal | Mn | Fries ppm |
|---|---|---|
| NaOH ($1.0 \times 10^{-6}$) | 8,800 | 387 |
| $Na_2B_4O_7$/EDTA ($1.0 \times 10^{-6}$) | 8,160 | 271 |
| $Na_2Mg$/EDTA ($1.0 \times 10^{-6}$) | 8,500 | <200 |
| $NaH_2PO_3$ | 8,200 | <200 |

Tables 2 and 3 illustrate that the use of TBPA with a less active alkali metal salt with improved Fries selectivity produces good molecular weight build and low Fries levels.

TABLE 4

| Catalyst | Oligomer $M_w$ | Polymer $M_w$ | Fries |
|---|---|---|---|
| TMAH/NaOH ($1.0 \times 10^{-6}$) | 4400–4600 | 18,000 | 700 to 1000 ppms |
| TMAH/NaOH ($1.0 \times 10^{-7}$) | 2200 | No Mw Build | <100 ppms |
| TBPA/NaOH ($1.0 \times 10^{-6}$) | 5,200 | 18,000 | <200 ppms |

Table 4 shows that good molecular weight build is achieved with low levels of alkali metal catalysts in combination with TBPA.

The following is a description of how the preparation was prepared for sample 1 in Tables 1–3. The remaining samples were prepared by an otherwise identical procedure except as noted.

Synthesis of Sample 1

The following reactions were carried out in a 1 liter glass batch reactor equipped with a solid nickel helical agitator. The glass reactor surface was passivated by acid washing, rinsing, and subsequently drying overnight at 70° C. and stored covered until use.

The temperature of the reactor was maintained using a fluidized sand bath with a PID controller and measured near the reactor and sand bath interface. The pressure of the reactor was controlled by a nitrogen bleed into the vacuum pump downstream of the distillate collection flasks and measured at higher pressures (760 mm Hg to 40 mm Hg) with a mercury barometer, and at lower pressures (40 mm Hg to 1 mm Hg) with an Edward pirani gauge.

Tetramethyl ammonium hydroxide and tetrabutyl phosphonium acetate (SACHEM, $1.32 \times 10^{-4}$) and NaOH (J. T. BAKER, $5.00 \times 10^{-7}$ mol) were prepared by dilution to the proper concentrations (0.220 M TMAH or TBPH and $1.00 \times 10^{-3}$ M NaOH) with 18 Mohm water. Additional catalysts were prepared by dissolution in 18 Mohm water to the appropriate concentration. When increased level or a catalyst or impurity were needed, the concentration of the catalyst solution was increased so as to maintain consistent injection volumes.

The reactor was charged with 0.6570 mol BPA and 0.7096 mol diphenyl carbonate prior to assembly. The reactor was then assembled, sealed and the atmosphere was exchanged with nitrogen three times. With the final nitrogen exchange, the reactor was brought to about atmospheric pressure and submerged into the fluidized bath which was at 180° C. After five minutes, agitation was begun at 250 rpm. After an additional ten minutes, the reactants were fully melted and a homogeneous mixture was assumed. Tetramethyl ammonium hydroxide (TMAH, $1.32 \times 10^{-4}$ mol) and sodium hydroxide (NaOH, $5.00 \times 10^{-7}$ mol) were added sequentially after being diluted to the proper concentrations (0.220 M TMAH and $5.00 \times 10^{-3}$ M NaOH) with 18 Mohm water. After the final catalyst was added, timing began, and the temperature was ramped to 210° C. in five minutes. Once at temperature, the pressure was reduced to 180 mm Hg and phenol distillate was immediately formed. After 25 minutes, the pressure was again reduced to 100 mm Hg and maintained for 45 minutes.

The temperature was then ramped to 240° C. in five minutes and the pressure was lowered to 15 mm Hg. These conditions were maintained for 45 minutes. The temperature was then ramped to 270° C. in five minutes and the pressure was lowered to 2 mm Hg. These conditions were maintained for 10 minutes. The temperature was then ramped to the final finishing temperature in five minutes and the pressure was reduced to 1.1 mm Hg. The finishing temperature was 310° C. After 30 minutes, the reactor was removed from the sand bath and the melt was extruded into liquid nitrogen to quench the reaction.

This invention has been described in detail with particular reference to preferred embodiments thereof, but it will be understood that variations and modifications can be effected within the spirit and scope of the invention.

What is claimed is:

1. A method of preparing polycarbonate by the melt process comprising the steps of:
   a) melting a dihydric phenol and a diester of carbonic acid for a time and at a temperature sufficient to form a melt; and thereafter introducing a catalyst composition comprising a tetraorganophosphonium salt or a derivative thereof and
      1) an alkali and/or alkali earth metal compound or derivative thereof or
      2) a less active alkali and/or alkali earth metal derivative thereof into the melt; and
   b) oligomerizing the product from step a) to a number average molecular weight of from about 3000 to about 7500; and
   c) polymerizing the product from step b) to a number average molecular weight of from about 16,000 to about 35,000.

2. A method of preparing polycarbonate by the melt process comprising the steps of
   a) melting a dihydric phenol and a diester of carbonic acid for a time and at a temperature sufficient to form a melt; and thereafter introducing a catalyst composition comprising from about $1.0 \times 10^{-5}$ to about $5.0 \times 10^{-4}$ moles/mol dihydric phenol of a tetraorganophosphonium salt or a derivative thereof and
      1) from about $1.0 \times 10^{-7}$ to about $1.0 \times 10^{-6}$ moles/mole dihydric phenol of an alkali and/or alkali earth metal compound or derivative thereof or
      2) from about $0.1 \times 10^{-6}$ to about $5.0 \times 10^{-6}$ moles/mole of dihydric phenol of a less active alkali and/or alkali earth metal derivative thereof into the melt; and
   b) oligomerizing the product from step a) in a two stage reaction system comprising two continuous oligomerization reactors in series, the first oligomerization reactor maintained at a temperature of from about 210° C. to about 260° C.; the second oligomerization reactor maintained at from about 250° C. to about 290° C.; wherein the product from the second oliogmerization reactor has a number average molecular weight of from about 3000 to about 7500
   c) polymerizing the product from step b) in a two stage polymerization system comprising two continuous polymerization reactors in series, the first polymerization reactor maintained at a temperature of from about 285° C. to about 315° C.; the second polymerization reactor maintained at from about 280° C. to about 310° C.; wherein the product from the second polymerization reactor has a number average molecular weight of from about 16,000 to about 35,000.

3. The method of claim 3, wherein the less active alkali metal salt or derivative thereof is selected from the group consisting of complexes of alkali borate metal salts with EDTA; alkali metal salts of oxo acids of sulfur; alkali metal salts of nonvolatile acids; and alkali or alkali earth metal salts of ethylenediamine tetraacetic acid.

4. The method of claim 1, wherein the dihydric phenol is BPA.

5. The method of claim 1, wherein the diester of carbonic acid is diphenyl carbonate.

6. The method of claim 2, wherein the dihydric phenol is BPA.

7. The method of claim 2, wherein the diester of carbonic acid is diphenyl carbonate.

* * * * *

(12) EX PARTE REEXAMINATION CERTIFICATE (5441st)
United States Patent
McCloskey et al.

(10) Number: US 6,228,973 C1
(45) Certificate Issued: Jul. 4, 2006

(54) METHOD FOR PREPARING HIGH MOLECULAR WEIGHT POLYCARBONATE

(75) Inventors: Patrick Joseph McCloskey, Watervilet, NY (US); Timothy Brydon Burnell, Niskayuna, NY (US); Paul Michael Smigelski, Jr., Schenectady, NY (US); Johan Pieter Anna Heuts, Randwick (AU); Hendricus Franciscus Zirkzee, Schore (NL)

(73) Assignee: General Electric Company, Schenectady, NY (US)

Reexamination Request:
No. 90/007,065, Jun. 7, 2004

Reexamination Certificate for:
Patent No.: 6,228,973
Issued: May 8, 2001
Appl. No.: 09/584,984
Filed: Jun. 2, 2000

(51) Int. Cl.
*C08G 64/00* (2006.01)

(52) U.S. Cl. .................................. 528/196; 528/198
(58) Field of Classification Search ............... 528/196, 528/198; 502/164; 568/749, 750
See application file for complete search history.

(56) References Cited

U.S. PATENT DOCUMENTS

| | | | | |
|---|---|---|---|---|
| 5,340,905 A | * | 8/1994 | Kuhling et al. | 528/199 |
| 5,399,659 A | * | 3/1995 | Kuhling et al. | 528/199 |
| 5,412,061 A | * | 5/1995 | King et al. | 528/198 |
| 5,414,057 A | * | 5/1995 | Campbell et al. | 525/462 |
| 5,459,226 A | * | 10/1995 | King et al. | 528/196 |
| 5,527,875 A | * | 6/1996 | Yokoyama et al. | 528/196 |
| 5,597,887 A | * | 1/1997 | King et al. | 528/196 |
| 5,717,056 A | * | 2/1998 | Varadarajan et al. | 528/196 |
| 6,184,334 B1 | * | 2/2001 | McCloskey et al. | 528/196 |
| 6,184,335 B1 | * | 2/2001 | McCloskey et al. | 528/198 |
| 6,252,035 B1 | * | 6/2001 | McCloskey et al. | 528/196 |
| 6,316,578 B1 | * | 11/2001 | McCloskey et al. | 528/196 |
| 6,333,394 B1 | * | 12/2001 | Bailly et al. | 528/196 |
| 6,414,106 B1 | * | 7/2002 | Smigelski et al. | 528/196 |
| 6,492,485 B1 | * | 12/2002 | Gohr et al. | 528/196 |
| 6,576,801 B1 | * | 6/2003 | Smigelski et al. | 568/724 |
| 6,723,823 B1 | * | 4/2004 | McCloskey et al. | 528/196 |
| 6,797,802 B1 | * | 9/2004 | McCloskey et al. | 528/196 |

FOREIGN PATENT DOCUMENTS

| | | | |
|---|---|---|---|
| DE | 199 33 132 | * | 1/2001 |
| JP | 2000-106126 | * | 4/1992 |
| JP | 0608778 | * | 3/1994 |
| JP | 08-245781 | * | 9/1996 |
| JP | 10-273528 | * | 10/1998 |

* cited by examiner

*Primary Examiner*—Douglas McGinty

(57) ABSTRACT

A method of preparing polycarbonate by the melt process comprising the steps of:
  a) melting a dihydric phenol and a diester of carbonic acid for a time and at a temperature sufficient to form a melt; and thereafter introducing a catalyst composition comprising a tetraorganophosphonium salt or a derivative thereof and
   1) an alkali and/or alkali earth metal compound or derivative thereof or
   2) a less active alkali and/or alkali earth metal derivative thereof into the melt; and
  b) oligomerizing the product from step a) to a number average molecular weight of from about 3000 to about 7500; and
  c) polymerizing the product from step b) to a number average molecular weight of from about 16,000 to about 35,000.

US 6,228,973 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–3 are determined to be patentable as amended.

Claims 4–7, dependent on an amended claim, are determined to be patentable.

New claims 8–20 are added and determined to be patentable.

1. A method of preparing polycarbonate by the melt process comprising the steps of:
   a) melting a dihydric phenol and a diester of carbonic acid for a time and at a temperature sufficient to form a melt; and thereafter introducing a catalyst composition comprising a tetraorganophosphonium *carboxylic acid* salt or a derivative thereof and
      1) an alkali and/or alkali earth metal compound or derivative thereof or
      2) a less active alkali and/or alkali earth metal derivative thereof into the melt; and
   b) oligomerizing the product from step a) to a number average molecular weight of from about 3000 to about 7500; and
   c) polymerizing the product from step b) to a number average molecular weight of from about 16,000 to about 35,000.

2. A method of preparing polycarbonate by the melt process comprising the steps of
   a) melting a dihydric phenol and a diester of carbonic acid for a time and at a temperature sufficient to form a melt; and thereafter introducing a catalyst composition comprising from about $1.0 \times 10^{-5}$ to about $5.0 \times 10^{-4}$ moles/mol dihydric phenol of a tetraorganophosphonium *carboxylic acid* salt or a derivative thereof and
      1) from about $1.0 \times 10^{-7}$ to about $1.0 \times 10^{-6}$ moles/mole dihydric phenol of an alkali and/or alkali earth metal compound or derivative thereof or
      2) from about $0.1 \times 10^{-6}$ to about $5.0 \times 10^{-6}$ moles/mole of dihydric phenol of a less active alkali and/or alkali earth metal derivative thereof into the melt; [and]
   b) oligomerizing the product from step a) in a two stage reaction system comprising two continuous oligomerization reactors in series, the first oligomerization reactor maintained at a temperature of from about 210° C. to about 260° C.; the second oligomerization reactor maintained at from about 250° C. to about 290° C.; wherein the product from the second [oliogmerization] *oligomerization* reactor has a number average molecular weight of from about 3000 to about 7500; *and*
   c) polymerizing the product from step b) in a two stage polymerization system comprising two continuous polymerization reactors in series, the first polymerization reactor maintained at a temperature of from about 285° C. to about 315° C.; the second polymerization reactor maintained at from about 280° C. to about 310° C.; wherein the product from the second polymerization reactor has a number average molecular weight of from about 16,000 to about 35,000.

3. The method of claim [3] *1*, wherein the *catalyst composition comprises a* less active alkali *and/or alkali earth* metal salt or derivative thereof *which* is selected from the group consisting of complexes of alkali borate metal salts with EDTA; alkali metal salts of oxo acids of sulfur; alkali metal salts of nonvolatile acids; and alkali or alkali earth metal salts of ethylenediamine tetraacetic acid.

*8. The method of claim 2, wherein the catalyst composition comprises a less active alkali metal salt or derivative thereof which is selected from the group consisting of complexes of alkali borate metal salts with EDTA; alkali metal salts of oxo acids of sulfur; alkali metal salts of nonvolatile acids; and alkali or alkali earth metal salts of ethylenediamine tetraacetic acid.*

*9. The method of claim 1, wherein the tetraorganophosphonium carboxylic acid salt is selected from the group consisting of tetramethylphosphonium acetate, tetraethylphosphonium acetate, tetrapropylphosphonium acetate, tetrabutylphosphonium acetate, tetrapentylphosphonium acetate, tetrahexylphosphonium acetate, tetraheptylphosphonium acetate, tetraoctylphosphonium acetate, tetradecylphosphonium acetate, tetradodecylphosphonium acetate, tetratolylphosphonium acetate, tetraphenylphosphonium acetate, tetramethylphosphonium benzoate, tetraethylphosphonium benzoate, tetrapropylphosphonium benzoate, tetraphenylphosphonium benzoate, tetramethylphosphonium formate, tetraethylphosphonium formate, tetrapropylphosphonium formate, tetraphenylphosphonium formate, tetramethylphosphonium propionate, tetraethylphosphonium propionate, tetrapropylphosphonium propionate, tetramethylphosphonium butyrate, tetraethylphosphonium butyrate, and tetrapropylphosphonium butyrate.*

*10. The method of claim 1, wherein the tetraorganophosphonium carboxylic acid salt is tetrabutylphosphonium acetate.*

*11. The method of claim 10, wherein the catalyst composition comprises a less active alkali and/or alkali earth metal salt selected from the groups consisting of alkali metal salts of phosphites; alkali earth metal salts of phosphites; alkali metal salts of phosphates; and alkali earth metal salts of phosphates.*

*12. The method of claim 11, wherein the alkali and/or alkali earth metal salt is selected from the group consisting of $NaH_2PO_3$; $NaH_2PO_4$; $KH_2PO_4$; $CsH_2PO_4$ and mixtures thereof.*

*13. The method of claim 1, wherein the catalyst composition comprises a less active alkali and/or alkali earth metal salt selected from the groups consisting of alkali metal salts of phosphites; alkali earth metals salts of phosphites; alkali metal salts of phosphates; and alkali earth metal salts of phosphates.*

*14. The method of claim 13, wherein the alkali and/or alkali earth metal salt is selected from the group consisting of $NaH_2PO_3$; $NaH_2PO_4$; $KH_2PO_4$; $CsH_2PO_4$ and mixtures thereof.*

*15. The method of claim 2, wherein the tetraorganophosphonium carboxylic acid salt is selected from the group consisting of tetramethylphosphonium acetate, tetraethylphosphonium acetate, tetrapropylphosphonium acetate, tetrabutylphosphonium acetate, tetrapentylphosphonium acetate, tetrahexylphosphonium acetate, tetraheptylphos-* phonium acetate, tetraoctylphosphonium acetate, tetradecylphosphonium acetate, tetradodecylphosphonium acetate, tetratolylphosphonium acetate, tetraphenylphosphonium acetate, tetramethylphosphonium benzoate, tetraethylphosphonium benzoate, tetrapropylphosphonium benzoate, tetraphenylphosphonium benzoate, tetramethylphosphonium formate, tetraethylphosphonium formate, tetrapropylphosphonium formate, tetraphenylphosphonium formate, tetramethylphosphonium propionate, tetraethylphosphonium propionate, tetrapropylphosphonium propionate, tetramethylphosphonium butyrate, tetraethylphosphonium butyrate, and tetrapropylphosphonium butyrate.

16. The method of claim 2, wherein the tetraorganophosphonium carboxylic acid salt is tetrabutylphosphonium acetate.

17. The method of claim 16, wherein the catalyst composition comprises a less active alkali and/or alkali earth metal salt selected from the groups consisting of alkali metal salts of phosphites; alkali earth metal salts of phosphites; alkali metal salts of phosphates; and alkali earth metal salts of phosphates.

18. The method of claim 17, wherein the alkali and/or alkali earth metal salt is selected from the group consisting of $NaH_2PO_3$; $NaH_2PO_4$; $KH_2PO_4$; $CsH_2PO_4$ and mixtures thereof.

19. The method of claim 2, wherein the catalyst composition comprises a less active alkali and/or alkali earth metal salt selected from the groups consisting of alkali metal salts of phosphites; alkali earth metal salts of phosphites; alkali metal salts of phosphates; and alkali earth metal salts of phosphates.

20. The method of claim 19, wherein the alkali and/or alkali earth metal salt is selected from the group consisting of $NaH_2PO_3$; $NaH_2PO_4$; $KH_2PO_4$; $CsH_2PO_4$ and mixtures thereof.

* * * * *